United States Patent
Hu et al.

(10) Patent No.: US 11,835,389 B2
(45) Date of Patent: Dec. 5, 2023

(54) TEMPERATURE MEASURING DEVICE AND TEMPERATURE MEASURING METHOD

(71) Applicant: Ching-Feng Lee, Taichung (TW)

(72) Inventors: Ja-Son Hu, Taipei (TW); Ching-Feng Lee, Taichung (TW)

(73) Assignee: Ching-Feng Lee, Taichung (TW)

( * ) Notice: Subject to any disclaimer, the term of this patent is extended or adjusted under 35 U.S.C. 154(b) by 460 days.

(21) Appl. No.: 17/151,666

(22) Filed: Jan. 19, 2021

(65) Prior Publication Data

US 2021/0389185 A1 Dec. 16, 2021

(30) Foreign Application Priority Data

Jun. 12, 2020 (TW) .................................. 109119919

(51) Int. Cl.
| | |
|---|---|
| *G01J 5/00* | (2022.01) |
| *H04N 5/33* | (2023.01) |
| *H04N 23/10* | (2023.01) |
| *G01J 5/80* | (2022.01) |

(52) U.S. Cl.
CPC .............. *G01J 5/0025* (2013.01); *H04N 5/33* (2013.01); *H04N 23/10* (2023.01); *G01J 5/80* (2022.01); *G01J 2005/0077* (2013.01)

(58) Field of Classification Search
CPC .......... G01J 5/025; G01J 5/0265; G01J 5/089; G01J 5/0859; G01J 5/60; G01J 2005/0081; G01J 2005/106; G01J 2005/0077; G01J 5/0275; G01J 5/0025; G01J 5/80; A61B 5/01; A61B 5/70; A61B 5/743; G01K 1/20; H04N 5/33; H04N 23/10; H04N 23/11
See application file for complete search history.

(56) References Cited

U.S. PATENT DOCUMENTS

| | | | |
|---|---|---|---|
| 7,457,411 B2 | 11/2008 | Soliman | |
| 2013/0230074 A1* | 9/2013 | Shin ......................... | A61B 5/01 374/129 |
| 2016/0113505 A1 | 4/2016 | Ando | |
| 2018/0110416 A1* | 4/2018 | Masuda ............... | A61B 5/0077 |

FOREIGN PATENT DOCUMENTS

| | | |
|---|---|---|
| TW | I240070 B | 9/2005 |
| TW | I261110 B | 9/2006 |
| TW | M601819 U | 9/2020 |

* cited by examiner

*Primary Examiner* — Brandi N Hopkins
*Assistant Examiner* — Janice M Soto
(74) *Attorney, Agent, or Firm* — Li & Cai Intellectual Property Office

(57) ABSTRACT

A temperature measuring device and a temperature measuring method are provided. The temperature measuring device includes a processing module, a first image capturing module and a second image capturing module. The processing module calculates a second reference area, a third temperature measuring area and a fourth temperature measuring area of a second image information according to a first reference area, a first temperature measuring area and a second temperature measuring area of a first image information, respectively. The processing module obtains a first detected temperature value of a test subject in the third temperature measuring area.

16 Claims, 11 Drawing Sheets

TEMPERATURE MEASURING DEVICE AND TEMPERATURE MEASURING METHOD

CROSS-REFERENCE TO RELATED PATENT APPLICATION

This application claims the benefit of priority to Taiwan Patent Application No. 109119919, filed on Jun. 12, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a temperature measuring device and a temperature measuring method, and more particularly to a temperature measuring device and a temperature measuring method that greatly reduce the amount of calculations.

BACKGROUND OF THE DISCLOSURE

In the field of remote temperature measurement, it is common to use thermal image information for temperature determination. However, due to the uncertainty of the contour of the thermal image information, a detected temperature value of an appropriate part of a test subject cannot be accurately obtained, and only a very rough approximation of the temperature value can be acquired. Further, large calculations can be burdensome if precise temperature values need to be obtained.

Therefore, how a temperature measurement system that reduces the amount of calculations can be provided has become one of the most important issues to be resolved in the related art.

SUMMARY OF THE DISCLOSURE

In response to the above-referenced technical inadequacies, the present disclosure provides a temperature measuring device that includes a processing module, a first image capturing module, and a second image capturing module.

The first image capturing module is electrically connected to the processing module, and captures a first image information of a test subject. The second image capturing module is electrically connected to the processing module and captures a second image information of the test subject. The processing module calculates a second reference area, a third temperature measuring area and a fourth temperature measuring area of the second image information according to a first reference area, a first temperature measuring area and a second temperature measuring area of the first image information, respectively, and the processing module obtains a first detected temperature value of the test subject in the third temperature measuring area.

In another aspect, the present disclosure provides a temperature measuring device that includes a processing module, a first image capturing module and a second image information capturing module. The first image capturing module is electrically connected to the processing module and captures a first image information of a test subject. The second image capturing module is electrically connected to the processing module and captures a second image information of the test subject. The processing module calculates a second reference area and a second temperature measuring area of the second image information according to a first reference area and a first temperature measuring area of the first image information, respectively. The processing module obtains a detected temperature value of the test subject in the second temperature measuring area according to the second reference area and the second temperature measuring area.

In yet another aspect, the present disclosure provides a temperature measuring method that includes capturing a first image information and a second image information of a test subject, calculating a first reference area, a first temperature measuring area and a second temperature measuring area according to the first image information, performing a mapping process on the first image information and the second image information, and calculating a second reference area, a third temperature measuring area and a fourth temperature measuring area of the second image information according to the first reference area, the first temperature measuring area and the second temperature measuring area of the first image information respectively, and selecting a plurality of temperature measuring positions in each of the third temperature measuring area and the fourth temperature measuring area and performing a temperature measurement to obtain a first detected temperature value and a second detected temperature value of the test subject.

Therefore, the temperature measuring system, the temperature measuring device and the temperature measuring method provided in the present disclosure can not only allow the detected temperature value of a test subject to be accurately obtained, but can also greatly reduce the amount of calculations and improve the calculation efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
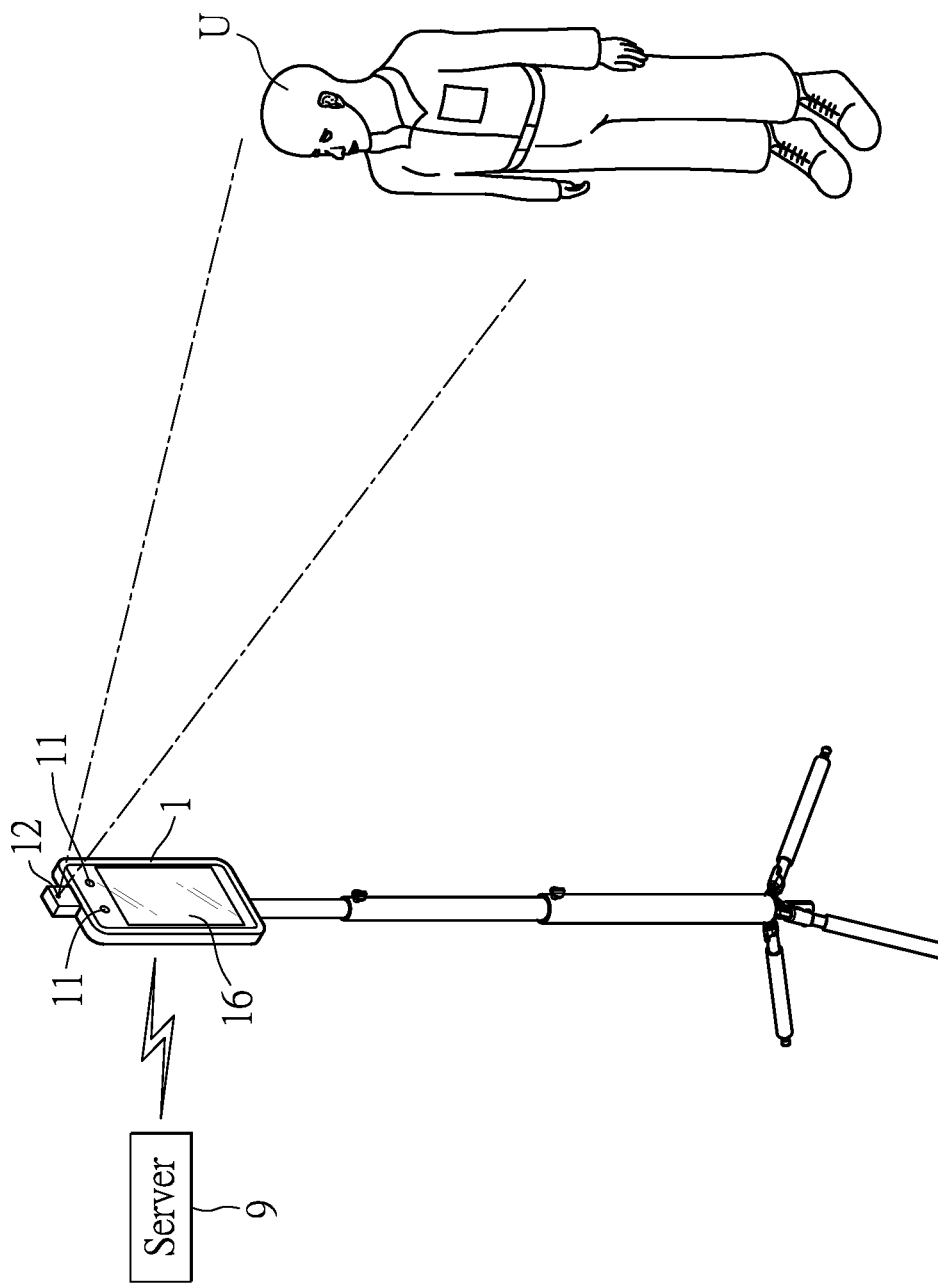
FIG. 1 is a schematic view of a temperature measuring system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
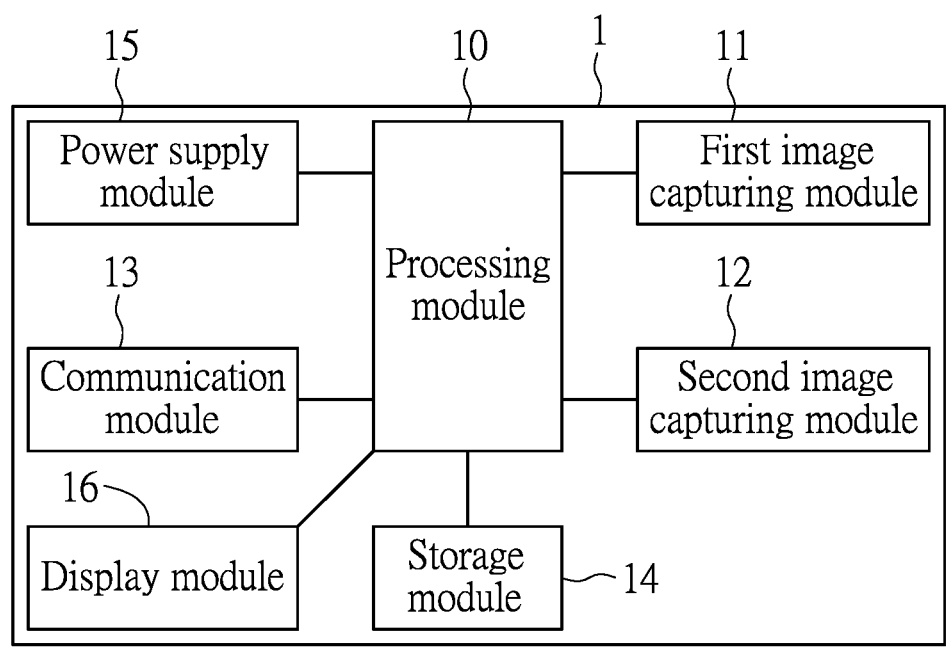
FIG. 2 is a functional block diagram of a temperature measuring device of the present disclosure.
Figure 3:
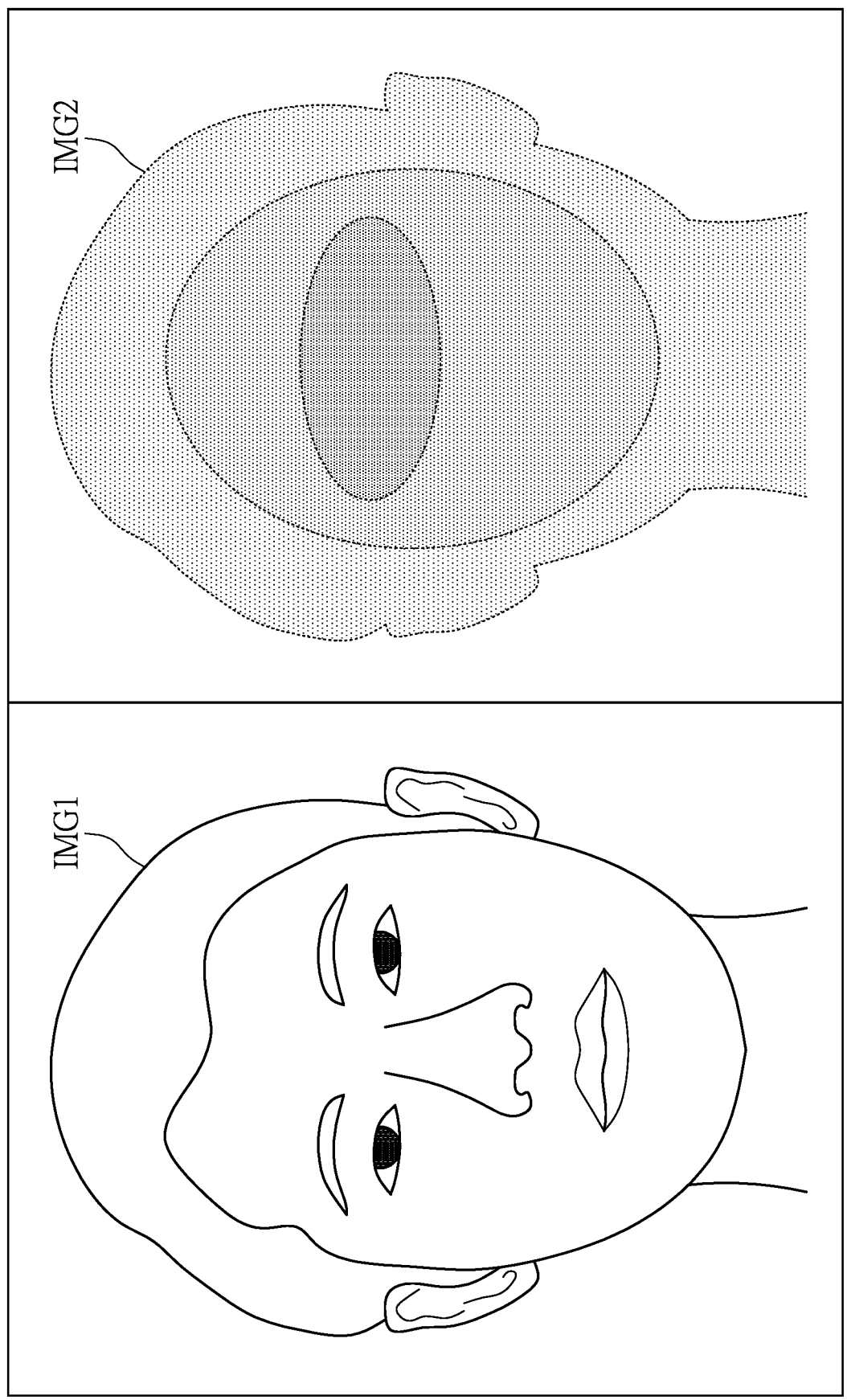
FIG. 3 is a schematic view of a first image information and a second image information captured by the temperature measuring device of the present disclosure.

Referring to FIG. 1 to FIG. 3, FIG. 1 is a schematic view of a temperature measuring system according to a first embodiment of the present disclosure, FIG. 2 is a functional block diagram of a temperature measuring device of the present disclosure, and FIG. 3 is a schematic view of a first image information and a second image information captured by the temperature measuring device of the present disclosure.

The temperature measuring system SYS1 includes a temperature measuring device 1 and a server 9. The temperature measuring device 1 is connected to the server 9. In the present embodiment, the temperature measuring device 1 can be electrically connected to the server 9 or connected to the server 9 through communication. In the present embodiment, the temperature measuring device 1 can operate independently, that is, the temperature measuring device 1 can store each captured image information and detected temperature values independently. In other embodiments, the temperature measuring device 1 can work with the server 9 to upload each of the captured image information and the detected temperature values, or use the server 9 for combining image information and management information or performing other procedures.

The temperature measuring device 1 includes a processing module 10, a first image capturing module 11, a second image capturing module 12, a communication module 13, a storage module 14, a power supply module 15 and a display module 16.

The processing module 10 is electrically connected to each of the first image capturing module 11, the second image capturing module 12, the communication module 13, the storage module 14, the power supply module 15 and the display module 16. The power supply module 15 provides a driving electrical energy to each of the processing module 10, the first image capturing module 11, the second capturing module 12, the communication module 13, the storage module 14 and the display module 16 of the temperature measuring device 1.

In the present embodiment, the first image capturing module 11 and the second image capturing module 12 are arranged next to each other. That is, the first image capturing module 11 and the second image capturing module 12 are arranged adjacent to each other up and down or left and right. As shown in FIG. 1, the first image capturing module 11 and the second image capturing module 12 are arranged adjacent to each other up and down. In addition, the temperature measuring device 1 in the present embodiment includes two first image capturing modules 11. In other embodiments, the temperature measuring device 1 can include only one first image capturing module 11. Moreover, a first image information of a test subject U can be displayed on the display module 16 in real time. Two first image capturing modules 11 can be used to create a 3D image information to prevent the use of a 2D image information, such as using a paper photo or displaying a 2D image information on a tablet PC, to avoid detection. Further, the resolution of the first image capturing module 11 and the second image capturing module 12 can be different. In the present embodiment, the resolution of the first image capturing module 11 is higher than the resolution of the second image capturing module 12. In other embodiments, the resolution of the first image capturing module 11 is lower than the resolution of the second image capturing module 12. In addition, the two first image capturing modules 11 can also use image capturing modules 11 of different purposes, for example, one of the image capturing modules 11 can be a general visible image capturing module, and the other can be an image capturing module for night vision. That is, the temperature measuring device 1 can improve performance through the combination of various image capturing modules.

The first image capturing module 11 is used for capturing a first image information IMG1 of the test subject U. The second image capturing module 12 is used for capturing a second image information IMG2 of the test subject U. In the present embodiment, the first image capturing module 11 is a visible light optical image capturing module, and the second image capturing module 12 is a thermal image capturing module or an infrared image capturing module. That is, the first image information IMG1 is a color image information or a grayscale image information, and the second image information IMG2 is a thermal image information or an infrared image information.

The processing module 10 calculates a second reference area REF2, a third temperature measuring area TA3 and a fourth temperature measuring area TA4 of the second image information IMG2 according to a first reference area REF1, a first temperature measuring area TA1 and a second temperature measuring area TA2 of the first image information IMG1, respectively. According to the second reference area REF2, the third temperature measuring area TA3 and the fourth temperature measuring area TA4, the processing module 10 obtains a first detected temperature value and a second detected temperature value in the third temperature measuring area TA3 and the fourth temperature measuring area TA4, respectively.

Figure 4:
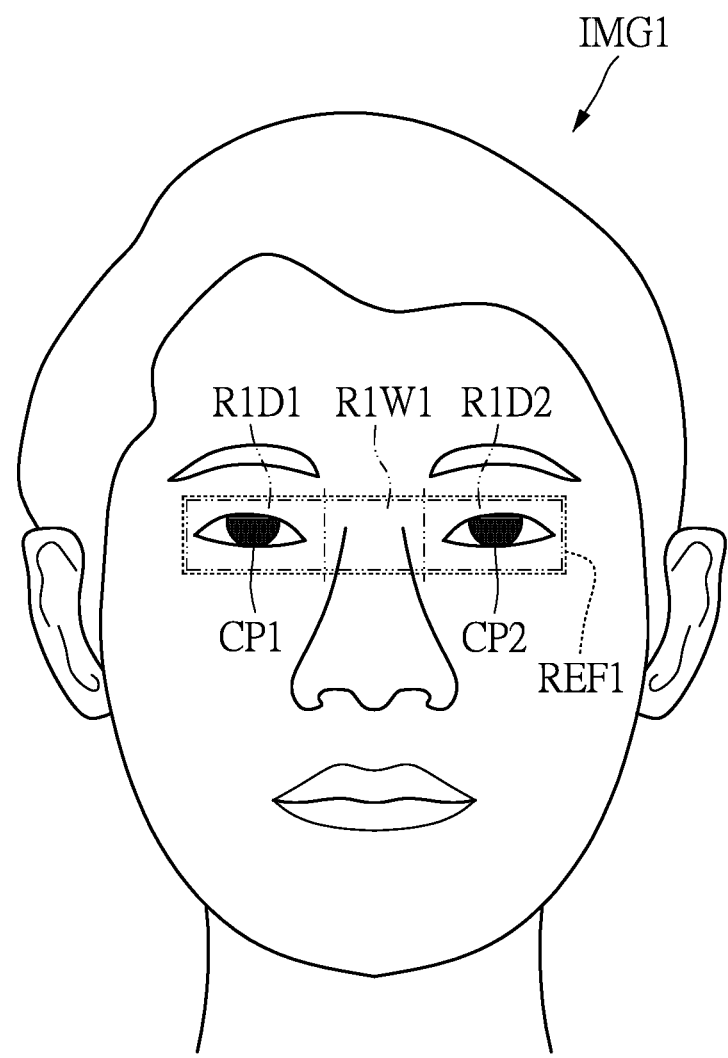
FIG. 4 is a schematic view of a first reference area of the first image information.
Figure 5:
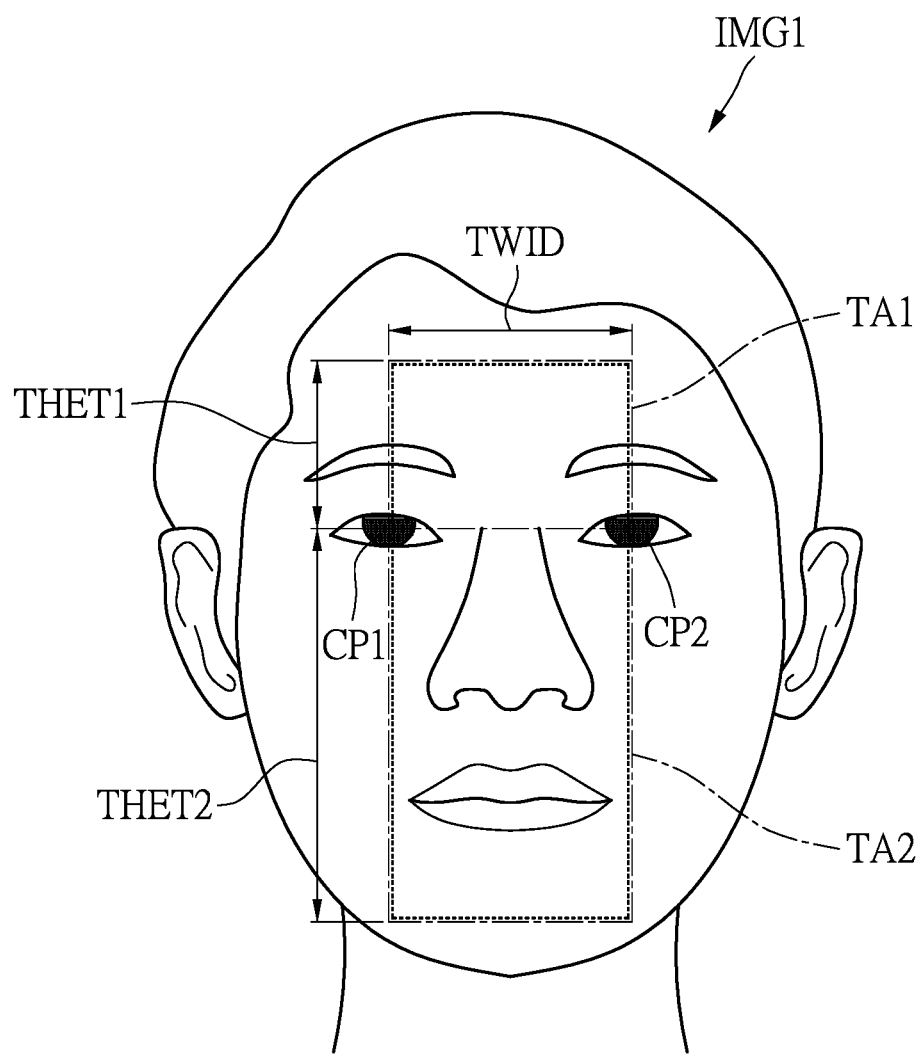
FIG. 5 is a schematic view of a first temperature measuring area and a second temperature measuring area of the first image information.

Referring to FIG. 4 and FIG. 5, FIG. 4 is a schematic view of the first reference area of the first image information, and FIG. 5 is a schematic view of the first temperature measuring area and the second temperature measuring area of the first image information.

In the present embodiment, the processing module 10 of the temperature measuring device 1 first looks for the first reference area REF1 in the first image information IMG1. The first reference area REF1 is an eye area of the test subject U. The eye area of the test subject U, as well as an area between the two eyes, is characterized by having dark colors on the two sides and light colors in the middle in the image information. This feature is especially noticeable when the first image information IMG1 is grayscale color image information. That is, the first reference area REF1 includes a first dark subarea R1D1, a light subarea R1W1 and a second dark subarea R1D2. In addition, the first dark subarea R1D1, the light subarea R1W1 and the second dark subarea R1D2 are arranged sequentially in a horizontal direction.

After the processing module 10 finds the first reference area REF1, it then calculates a center of the first dark subarea R1D1 and the second dark subarea R1D2 of the first reference area REF1. In the first image information IMG1, the first dark subarea R1D1 and the second dark subarea R1D2 are two dark areas, so that the processing module 10 correspondingly calculates the area size, maximum diameter, minimum diameter, and other parameters of the first dark subarea R1D1 and the second dark subarea R1D2, and then calculates a corresponding coordinate of a first center CP1 of the first dark subarea R1D1 and a second center CP2 of the second dark subarea R1D2. That is, the processing module 10 processes various calculations of the first image information IMG1 based on a coordinate system of the first image information IMG1. The coordinate system is determined according to the data size of the first image information IMG1.

Figure 6:
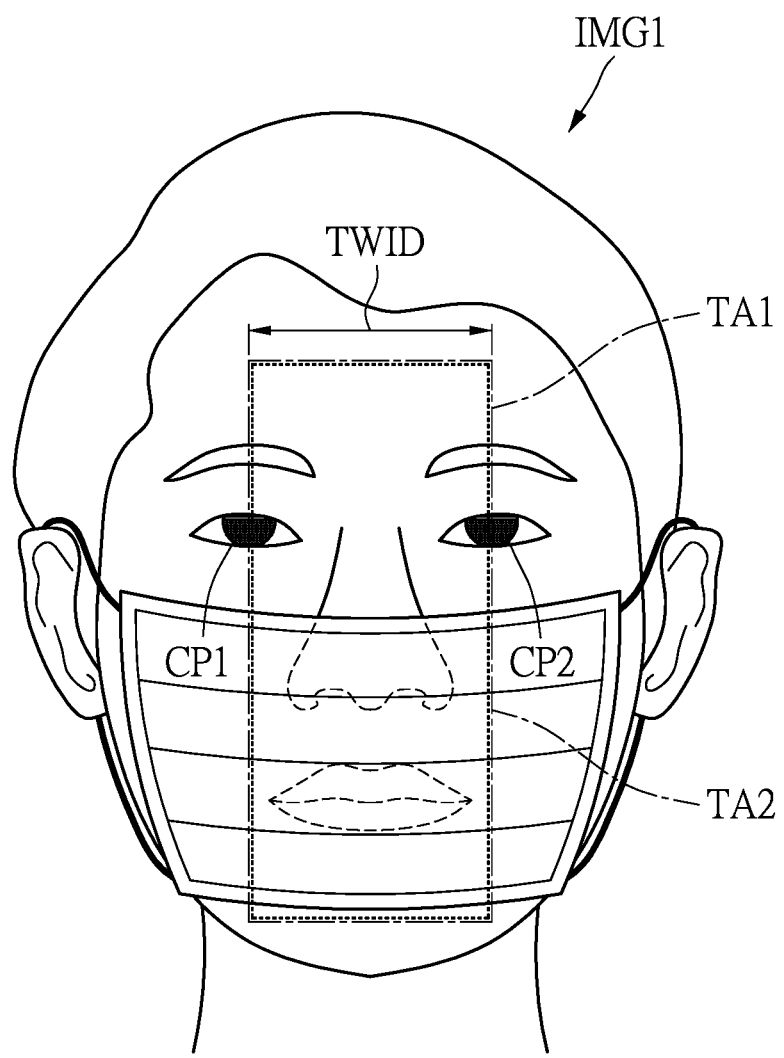
FIG. 6 is a schematic view of the first image information of a test subject wearing a mask with the first temperature measuring area and the second temperature measuring area.

Referring to FIG. 6, FIG. 6 is a schematic view of the first image information of a test subject wearing a mask with the first temperature measuring area and the second temperature measuring area.

Further, the first temperature measuring area TA1 is an area extending from a horizontal line connecting the first center CP1 of the first dark subarea R1D1 of the first reference area REF1 and the second center CP2 of the second dark subarea R1D2 of the first reference area REF1 toward the top of the head of the test subject U. That is, the first temperature measuring area TA1 is approximately the area around the eyebrows of the test subject U. In addition, the second temperature measuring area TA2 is an area extending from a horizontal line connecting the first center CP1 of the first dark subarea R1D1 of the first reference area REF1 and the second center CP2 of the second dark subarea R1D2 of the first reference area REF1 toward the nose and the mouth of the test subject U. That is, the second temperature measuring area TA2 is approximately the area around the nose and the mouth of the test subject U. That is, the area where the test subject U wears the mask.

In the present embodiment, the processing module 10 can calculate a temperature measuring width TWID of the first temperature measuring area TA1 and the second temperature measuring area TA2 according to the first reference area REF1. The temperature measuring width TWID is a distance between the first center CP1 of the first dark subarea R1D1 of the first reference area REF1 and the second center CP2 of the second dark subarea R1D2 of the first reference area REF1. The second temperature measuring area TA2 also uses the same temperature measuring width TWID.

In addition, a first temperature measuring height THET1 of the first temperature measuring area TA1 is N times the temperature measuring width TWID, where N is less than or equal to 1, and N is a rational number. That is, N can be equal to 0.5, 0.3 or 0.7. Moreover, the first temperature measuring height THET1 is less than or equal to the temperature measuring width TWID. When the first temperature measuring height THET1 is equal to the temperature measuring width TWID, the first temperature measuring area TA1 is a square. Further, a second temperature measuring height THET2 of the second temperature measuring area TA2 is R times the temperature measuring width TWID, where R is greater than or equal to 1, and N is a rational number. That is, N can be equal to 1, 1.2 or 1.5. In addition, the second temperature measuring height THET2 is generally greater than or equal to the temperature measuring width TWID.

Figure 7:
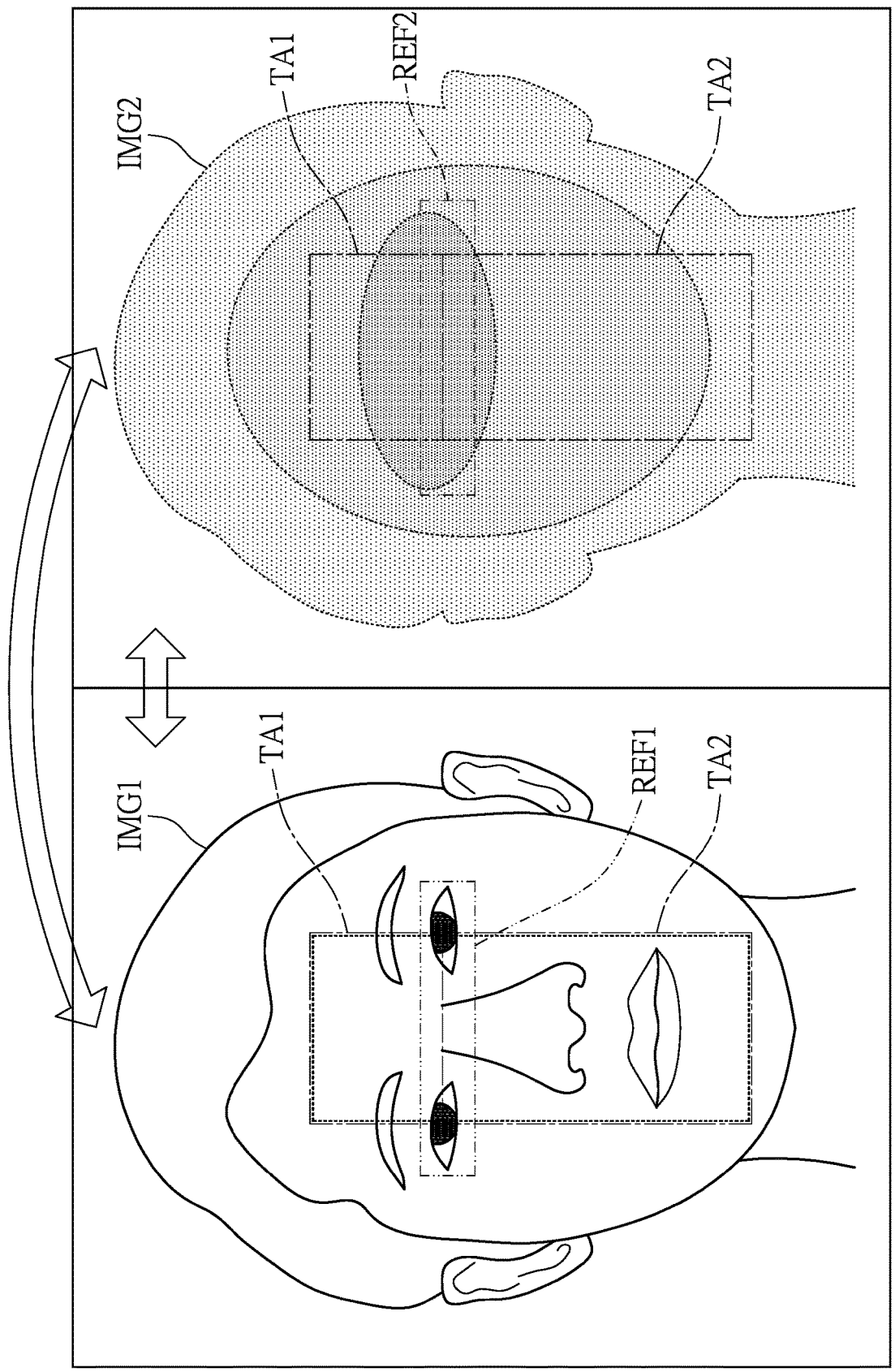
FIG. 7 is a schematic view of a mapping process being performed on the first image information and the second image information.
Figure 8:
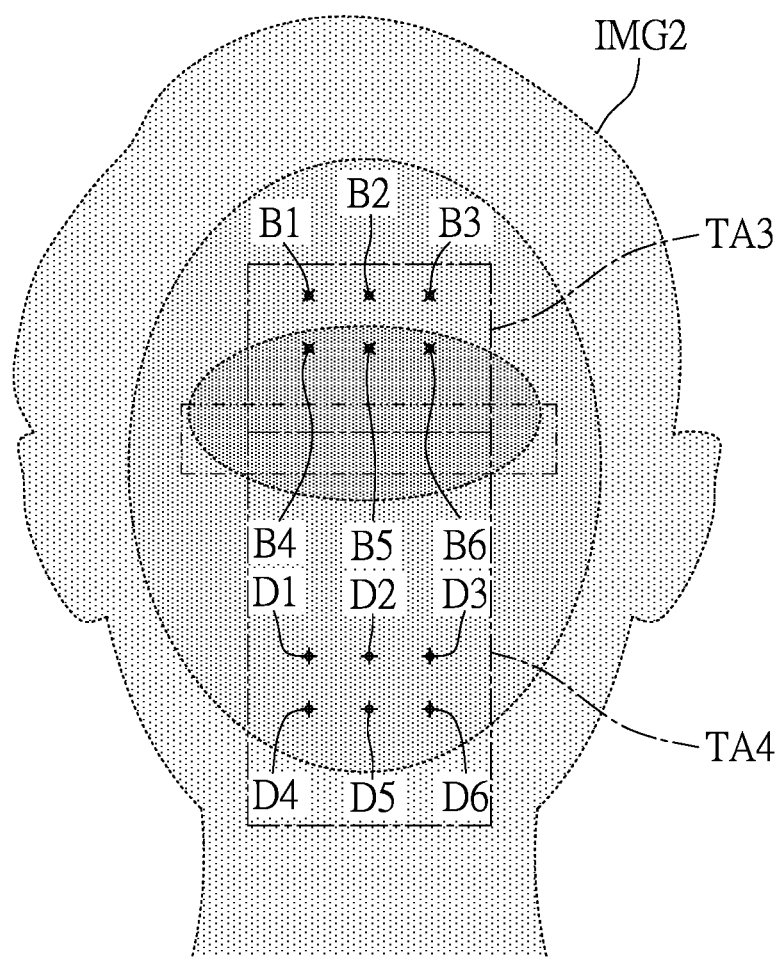
FIG. 8 is a schematic view of a plurality of temperature measuring positions selected in each of the third temperature measuring area and the fourth temperature measuring area of the second image information.

Referring to FIG. 7 and FIG. 8, FIG. 7 is a schematic view of a mapping process being performed on the first image information and the second image information, and FIG. 8 is a schematic view of a plurality of temperature measuring positions selected in each of the third temperature measuring area and the fourth temperature measuring area of the second image information.

After calculating the parameters and coordinates of the first temperature measuring area TA1, the processing module 10 can further perform a mapping process on the first image information IMG1 and the second image information IMG2 to calibrate coordinates of the first image information IMG1 and the second image information IMG2.

That is, after the mapping process, the processing module 10 can obtain the coordinates of the second reference area REF2, the third temperature measuring area TA3 and the fourth temperature measuring area TA4 of the second image information IMG2 according to the first reference area REF1, the first temperature measuring area TA1 and the second temperature measuring area TA2 of the first image information IMG1. In the present embodiment, the length and width of the first temperature measuring area TA1 and the third temperature measuring area TA3 are the same. The length and width of the second temperature measuring area TA2 and the fourth temperature measuring area TA4 are the same. The respective areas of the first temperature measuring area TA1 and the second temperature measuring area TA2 are the same. In other embodiments, the length and width of the first temperature measuring area TA1 and the third temperature measuring area TA3 can be scaled in equal proportions. The length and width of the second temperature measuring area TA2 and the fourth temperature measuring area TA4 can be scaled in equal proportions. Further, in the mapping process, a reference position can be selected as a reference point in the first image information IMG1, e.g., an endpoint of the first reference area REF1. The position of each area is determined by aligning the first image information IMG1 with the same reference point as the second image information IMG2. Because the first image information IMG1 and the second image information IMG2 can be image information of different resolutions, each pixel in the image information represents a different distance. Therefore, scaling can be performed in different areas with the same reference point.

Next, the processing module 10 selects a plurality of temperature measuring positions B1 to B6 from the third temperature measuring area TA3 of the second image information IMG2 and detects a plurality of temperature values of the plurality of temperature measuring positions B1 to B6. The processing module 10 also selects a plurality of temperature measuring positions D1 to D6 from the fourth temperature measuring area TA4 of the second image information IMG2 and detects a plurality of temperature values of the plurality of temperature measuring positions D1 to D6.

Figure 9:
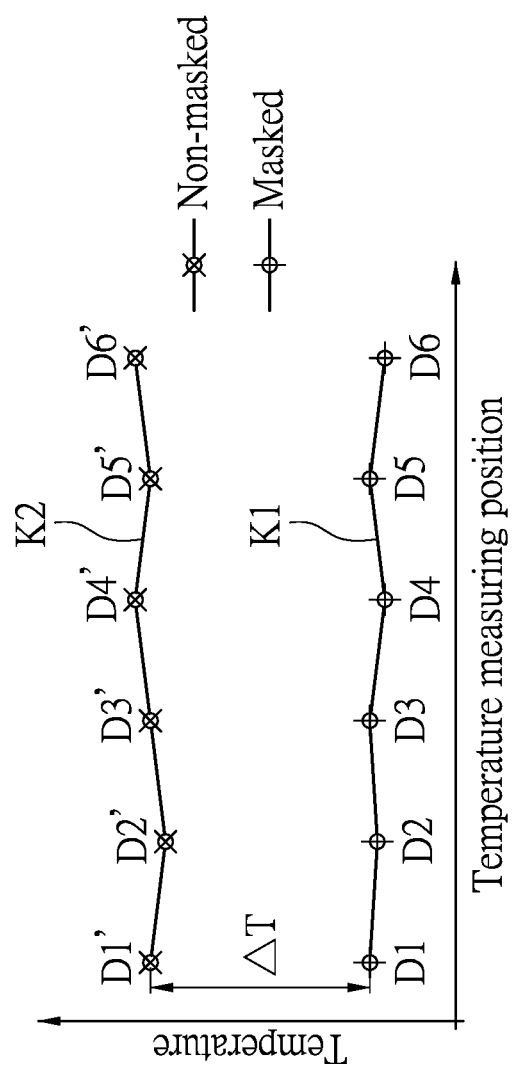
FIG. 9 is a schematic view of a temperature curve with or without a mask at the plurality of temperature measuring positions in the fourth temperature measuring area in FIG. 8.

Referring to FIG. 9, FIG. 9 is a schematic view of a temperature curve with or without a mask at the plurality of temperature measuring positions in the fourth temperature measuring area in FIG. 8.

The processing module 10 selects a highest temperature value of the plurality of temperature values of the plurality of temperature measuring positions B1 to B6 of the third temperature measuring area TA3 as a first detected temperature value of the test subject U. The processing module 10 selects a highest temperature value of the plurality of temperature values of the plurality of temperature measuring positions D1 to D6 of the fourth temperature measuring area TA4 as a second detected temperature value of the test subject U. In other embodiments, the processing module 10 can also average the plurality of temperature values of the plurality of temperature measuring positions B1 to B6 and the plurality of temperature measuring positions D1 to D6 to obtain an average temperature value as the first detected temperature value and the second detected temperature value of the test subject U, respectively. In the present embodiment, the number of the temperature measuring positions can be adjusted according to actual needs, and is not limited in the present disclosure.

A curve K1 is the second detected temperature value curve when the test subject U is wearing a mask. A curve K2 is the second detected temperature value curve when the test subject U is not wearing a mask. In addition, when the test subject U is wearing a mask, the second detected temperature value of the temperature measuring positions D1 to D6 is lower than a masked temperature interval ΔT of the second detected temperature value of the temperature measuring positions D1' to D6' when the test subject is not wearing a mask. The masked temperature interval ΔT is approximately 2 to 3° C. Accordingly, when a difference between the second detected temperature value of the masked temperature measuring positions D1 to D6 and the second detected temperature value of the non-masked temperature measuring positions D1' to D6' is greater than or equal to the masked temperature interval ΔT, the processing module 10 provides a mask wearing notification signal. That is, the processing module 10 determines if the test subject U is wearing a mask. When a difference between the second detected temperature value of the masked temperature measuring positions D1 to D6 and the second detected temperature value of the non-masked temperature measuring positions D1' to D6' is less than the masked temperature interval ΔT, the processing module 10 provides a non-masked notification signal. That is, the processing module 10 determines if the test subject U is not wearing a mask. That is, when the test subject U is wearing a mask, the second detected temperature value is lower than a masked temperature interval ΔT of the first detected temperature value.

Based on the difference between the second detected temperature value of the masked temperature measuring positions D1 to D6 and the second detected temperature value of the non-masked temperature measurement positions D1' to D6', it can be determined whether or not the test subject is wearing a mask. Therefore, the temperature measuring device 1 can not only quickly detect the body temperature of the test subject U, but also determine whether or not the test subject U is wearing a mask.

In the present embodiment, the processing module 10 of the temperature measuring device 1 detects moving objects in an image capturing range of the first image capturing module 11 and the second image capturing module 12. When a moving test subject U (human figure) is detected, that is, the test subject U enters the temperature measuring range of the temperature measuring device 1, the temperature measuring device 1 performs image capturing and temperature measuring procedures on the test subject U. In other embodiments, the test subject U can also be animals or other types of heat sources.

Figure 10:
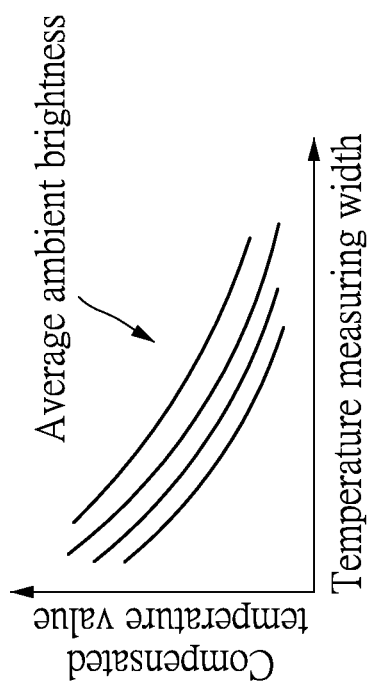
FIG. 10 is a compensated temperature relationship diagram of the detected temperature value of the temperature measuring device of the present disclosure.

Referring to FIG. 10, FIG. 10 is a compensated temperature relationship diagram of the detected temperature value of the temperature measuring device of the present disclosure.

The temperature calibration procedure of the temperature measuring device 1 can use a heat source having a temperature close to the human body temperature and take measurements at a plurality of positions at different distances from the first image capturing module 11 and the second image capturing module 12 of the temperature measuring device 1, and detected temperature values are recorded and calibrated one by one.

Further, the temperature measuring device 1 can compensate for the detected temperature value of the test subject U according to the results of the temperature calibration procedure, the ambient brightness and the ambient temperature of the environment where the temperature measuring device 1 is set, and the size of the second temperature measuring area TA2. That is, after the temperature measuring device 1 obtains the detected temperature value of the test subject U from the second image information IMG2, the processing module 10 further adds a compensated temperature value to the detected temperature value to obtain a compensated detected temperature value based on the ambient brightness, the ambient temperature of the environment, and the size of the second temperature measurement area TA2 (especially the temperature measuring width TWID). The compensated temperature value is determined based on the ambient brightness, the ambient temperature, and the size of the second temperature measuring area TA2. Further, multiple curves in FIG. 8 vary based on the average ambient brightness.

In the present embodiment, the temperature measuring device 1 transmits the first image information IMG1, the second image information IMG2, the plurality of temperature values of the plurality of temperature measuring positions B1 to B6 and the detected temperature value of the test subject U to a storage device (not shown in figures) of the server 9 through the communication module 13. In the present embodiment, the temperature measuring device 1 can operate independently, that is, the temperature measuring device 1 can store each captured image information and the detected temperature value independently. In other embodiments, the temperature measuring device 1 can work with the server 9 to upload each of the captured image information and the detected temperature value, or use the server 9 for combining image information and management information or other procedures.

The storage module 14 stores the first image information IMG1, the second image information IMG2, the plurality of temperature values of the plurality of temperature measuring positions B1 to B6 and the detected temperature value of the test subject U.

The processing module 10 is a central processing unit (CPU), an application specific integrated circuit (ASIC) or a microcontroller (MCU). The storage module 14 is a flash memory, a read-only memory, a programmable read-only memory, an electrically rewritable read-only memory, an erasable and programmable read-only memory or an electrically-erasable programmable read-only memory. The communication module 13 includes a wired communication unit (not shown in figures) and a wireless communication unit (not shown in figures). The wired communication unit (not shown in figures) can be disposed independently to communicate with the server 9 to receive control signals from the server 9 or data in the database (not shown in figures) of the server 9. When the communication module 13 is a wireless communication unit, the communication module 13 can be a WI-FI® communication unit, a BLUETOOTH® communication unit, a Zigbee® communication unit, a LoRa communication unit, a Sigfox communication unit or an NB-IoT communication unit. The power supply module 15 can be a direct current (DC) to DC voltage converter or an alternating current (AC) to DC voltage converter.

Second Embodiment

Figure 11:
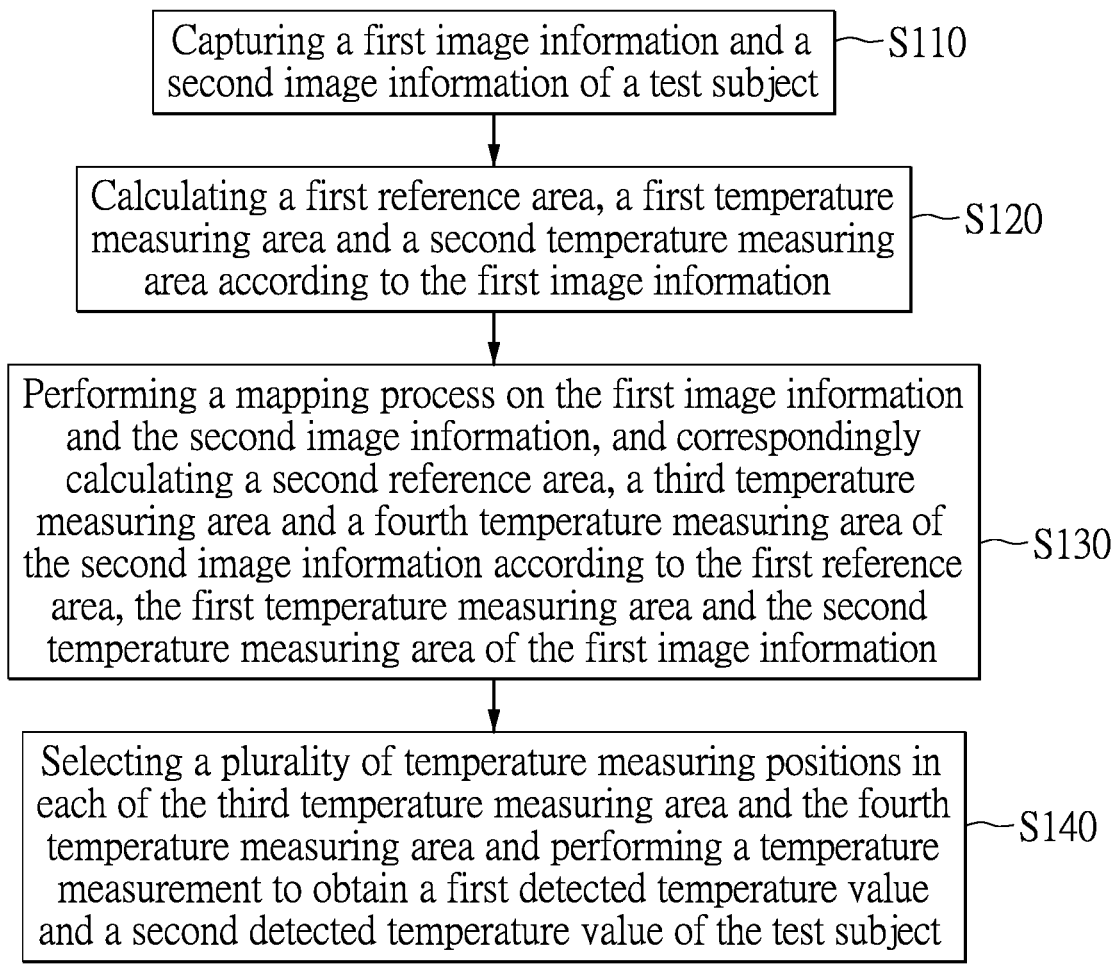
FIG. 11 is a flow chart of a temperature measuring method according to a second embodiment of the present disclosure.

Referring to FIG. 11, FIG. 11 is a flow chart of a temperature measuring method according to a second embodiment of the present disclosure.

The temperature measuring method in the present embodiment is applicable to the temperature measuring device 1 and the server 9 of the temperature measuring system SYS1 in the first embodiment, the structure and functions of which are not described herein.

The temperature measuring method in the present embodiment includes the following steps:

capturing a first image information and a second image information of a test subject (step S110);

calculating a first reference area, a first temperature measuring area and a second temperature measuring area according to the first image information (step S120);

performing a mapping process on the first image information and the second image information, and calculating a second reference area, a third temperature measuring area and a fourth temperature measuring area of the second image information according to the first reference area, the first temperature measuring area and the second temperature measuring area of the first image information, respectively (step S130); and selecting a plurality of temperature measuring positions in each of the third temperature measuring area and the fourth temperature measuring area and performing a temperature measurement to obtain a first detected temperature value and a second detected temperature value of the test subject (step S140).

In step S110, the first image capturing module 11 is used for capturing a first image information IMG1 of a test subject U. The second image capturing module 12 is used for capturing a second image information IMG2 of the test subject U. In the present embodiment, the first image capturing module 11 is a visible light optical image capturing module, and the second image capturing module 12 is a thermal image capturing module or an infrared thermal image capturing module. That is, the first image information IMG1 is a color image information or a grayscale image information, and the second information IMG2 is a thermal image information or an infrared image information. In other embodiments, the first image information IMG1 can also be a monochrome image information in three primary colors of RGB.

In step S120, the processing module 10 calculates a second reference area REF2, a third temperature measuring area TA3 and a fourth temperature measuring area TA4 of the second image information IMG2 according to a first reference area REF1, a first temperature measuring area TA1 and a second temperature measuring area TA2 of the first image information IMG1, respectively. According to the second reference area REF2, the third temperature measuring area TA3 and the fourth temperature measuring area TA4, the processing module 10 obtains a first detected temperature value and a second detected temperature value in the third temperature measuring area TA3 and the fourth temperature measuring area TA4, respectively.

In the present embodiment, the processing module 10 of the temperature measuring device 1 first looks for the first reference area REF1 in the first image information IMG1. The first reference area REF1 is an eye area of the test subject U. The eye area of the test subject U, as well as an area between the two eyes, is characterized by having dark colors on the sides and light colors in the middle in the image information. This feature is especially noticeable when the first image information IMG1 is a grayscale color image information. That is, the first reference area REF1 includes a first dark subarea R1D1, a light subarea R1W1 and a second dark subarea R1D2. In addition, the first dark subarea R1D1, the light subarea R1W1 and the second dark subarea R1D2 are arranged sequentially in a horizontal direction.

After the processing module 10 finds the first reference area REF1, it then calculates a center of the first dark subarea R1D1 and the second dark subarea R1D2 of the first reference area REF1. In the first image information IMG1, the first dark subarea R1D1 and the second dark subarea R1D2 are two dark areas, so that the processing module 10 correspondingly calculates the area size, maximum diameter, minimum diameter, and other parameters of the first dark subarea R1D1 and the second dark subarea R1D2, and then calculates a corresponding coordinate of a first center CP1 of the first dark subarea R1D1 and a second center CP2 of the second dark subarea R1D2. That is, the processing module 10 processes various calculations of the first image information IMG1 based on a coordinate system of the first image information IMG1. The coordinate system is determined according to the data size of the first image information IMG1.

Further, the first temperature measuring area TA1 is an area extending from a horizontal line connecting the first center CP1 of the first dark subarea R1D1 of the first reference area REF1 and a second center CP2 of the second dark subarea R1D2 of the first reference area REF1 toward the top of the head of the test subject U. That is, the first temperature measuring area TA1 is approximately the area around the eyebrows of the test subject U. In addition, the second temperature measuring area TA2 is an area extending from a horizontal line connecting the first center CP1 of the first dark subarea R1D1 of the first reference area REF1 and a second center CP2 of the second dark subarea R1D2 of the first reference area REF1 toward the nose and the mouth of the test subject U. That is, the second temperature measuring area TA2 is approximately the area around the nose and the mouth of the test subject U. That is, the area where the mask is worn on the test subject U.

In the present embodiment, the processing module 10 can calculate a temperature measuring width TWID of the first temperature measuring area TA1 and the second temperature measuring area TA2 according to the first reference area REF1. The temperature measuring width TWID is a distance between the first center CP1 of the first dark subarea R1D1 of the first reference area REF1 and the second center CP2 of the second dark subarea R1D2 of the first reference area REF1. The second temperature measuring area TA2 also uses the same temperature measuring width TWID.

In addition, a first temperature measuring height THET1 of the first temperature measuring area TA1 is N times the temperature measuring width TWID, where N is less than or equal to 1, and N is a rational number. That is, N can be equal to 0.5, 0.3 or 0.7. Moreover, the first temperature measuring height THET1 is less than or equal to the temperature measuring width TWID. When the first temperature measuring height THET1 is equal to the temperature measuring width TWID, the first temperature measuring area TA1 is a square. Further, a second temperature measuring height THET2 of the second temperature measuring area TA2 is R times the temperature measuring width TWID, where R is greater than or equal to 1, and N is a rational number. That is, N can be equal to 1, 1.2 or 1.5. In addition, the second temperature measuring height THET2 is generally greater than or equal to the temperature measuring width TWID.

In step S130, after calculating the parameters and coordinates of the first temperature measuring area TA1, the processing module 10 can further perform a mapping process on the first image information IMG1 and the second image information IMG2 to calibrate coordinates of the first image information IMG1 and the second image information IMG2. Further, in the mapping process, a reference position can be selected as a reference point in the first image information IMG1, e.g., an endpoint of the first reference area REF1. The position of each area is determined by aligning the first image information IMG1 and the second image information IMG2 with the same reference point. Because the first image information IMG1 and the second image information IMG2 can be image information of different resolutions, each pixel in the image information represents a different distance. Therefore, scaling can be done in different areas with the same reference point.

That is, after the mapping process, the processing module 10 can obtain the coordinates of the second reference area REF2, the third temperature measuring area TA3 and the fourth temperature measuring area TA4 of the second image information IMG2 according to the first reference area REF1, the first temperature measuring area TA1 and the second temperature measuring area TA2 of the first image information IMG1. In the present embodiment, the length and width of the first temperature measurement area TA1 and the third temperature measurement area TA3 are the same. The length and width of the second temperature measurement area TA2 and the fourth temperature measurement area TA4 are the same. The respective areas of the first temperature measuring area TA1 and the second temperature measuring area TA2 are the same. In other embodiments, the length and width of the first temperature measuring area TA1 and the second temperature measuring area TA2 can be scaled in equal proportions. The length and width of the second temperature measurement area TA2 and the fourth temperature measurement area TA4 can be scaled in equal proportions.

In step S140, next, the processing module 10 selects a plurality of temperature measuring positions B1 to B6 from the third temperature measuring area TA3 of the second image information IMG2 and detects a plurality of temperature values of the plurality of temperature measuring positions B1 to B6. The processing module 10 also selects a plurality of temperature measuring positions D1 to D6 from the fourth temperature measuring area TA4 of the second image information IMG2 and detects a plurality of temperature values of the plurality of temperature measuring positions D1 to D6. The processing module 10 selects a highest temperature value of the plurality of temperature values of the plurality of temperature measuring positions B1 to B6 of the third temperature measuring area TA3 as a first detected temperature value of the test subject U. The processing module 10 selects a highest temperature value of the plurality of temperature values of the plurality of temperature measuring positions D1 to D6 of the fourth temperature measuring area TA4 as a second detected temperature value of the test subject U. In other embodiments, the processing module 10 can also average the plurality of temperature values of the plurality of temperature measuring positions B1 to B6 and the plurality of temperature measuring positions D1 to D6 to obtain an average temperature value as the first detected temperature value and the second detected temperature value of the test subject U, respectively.

Beneficial Effects of the Embodiments

In conclusion, the temperature measuring system, the temperature measuring device and the temperature measuring method provided in the present disclosure can not only allow the detected temperature value of a test subject to be accurately obtained, but can also greatly reduce the amount of calculations and improve the calculation efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A temperature measuring device, comprising:
a processing module;
a first image capturing module electrically connected to the processing module, the first image capturing module capturing a first image information of a test subject; and a second image capturing module electrically connected to the processing module, the second image capturing module capturing a second image information of the test subject;

wherein the processing module calculates a second reference area, a third temperature measuring area and a fourth temperature measuring area of the second image information according to a first reference area, a first temperature measuring area and a second temperature measuring area of the first image information, respectively, and the processing module obtains a first detected temperature value of the test subject in the third temperature measuring area;

wherein the first image capturing module is a visible light optical image capturing module, the second image capturing module is a thermal image capturing module or an infrared thermal image capturing module, the first image information is a color image information or a grayscale image information, and the second information is a thermal image information or an infrared image information;

wherein the processing module obtains a second detected temperature value of the test subject in the fourth temperature measuring area;

wherein the first reference area is an eye area of the test subject, the first reference area is a rectangle, the first reference area includes a first dark subarea, a light subarea and a second dark subarea, and the first dark subarea, the light subarea and the second dark subarea are arranged sequentially in a horizontal direction.

2. The temperature measuring device according to claim 1, wherein each of the first, second, third, and fourth temperature measuring areas is an area extending from a horizontal line connecting a first center of the first dark subarea of the first reference area and a second center of the second dark subarea of the first reference area toward a top of the head of the test subject.

3. The temperature measuring device according to claim 2, wherein the processing module calculates a temperature measuring width according to the first reference area, the temperature measuring width being a distance between the first center of the first dark subarea of the first reference area and the second center of the second dark subarea of the first reference area.

4. The temperature measuring device according to claim 3, wherein a temperature measuring height of the temperature measuring area is N times the temperature measuring width, where N is less than or equal to 1, and N is a rational number.

5. The temperature measuring device according to claim 4, wherein the processing module performs a mapping process on the first image information and the second image information to calibrate coordinates of the first image information and the second image information, and obtains the second reference area of the second image information according to the first reference area of the first image information.

6. The temperature measuring device according to claim 5, wherein the processing module selects a plurality of temperature measuring positions from the third temperature measuring area of the second image information and detects a plurality of temperature values of the plurality of temperature measuring positions, and the processing module selects a highest temperature value of the plurality of temperature values of the plurality of temperature measuring positions as the first detected temperature value of the test subject.

7. The temperature measuring device according to claim 6, wherein the processing module selects a plurality of temperature measuring positions from the fourth temperature measuring area of the second image information and detects a plurality of temperature values of the plurality of temperature measuring positions, and the processing module selects a highest temperature value of the plurality of temperature values of the plurality of temperature measuring positions as the second detected temperature value of the test subject.

8. The temperature measuring device according to claim 7, wherein, when the second detected temperature value is greater than or equal to a masked temperature interval of the first detected temperature value, the processing module provides a mask wearing notification signal, and when the second detected temperature value is less than the masked temperature interval of the first detected temperature value, the processing module provides a non-masked notification signal.

9. The temperature measuring device according to claim 1, wherein, when the test subject enters a temperature measuring range of the temperature measuring device, the temperature measuring device performs an image capturing procedure and a temperature measuring procedure on the test subject.

10. The temperature measuring device according to claim 1, wherein the temperature measuring device further includes:
a communication module electrically connected to the processing module, the temperature measuring device transmitting the first image information, the second image information, a plurality of temperature values of a plurality of temperature measuring positions and the detected temperature value of the test subject to a storage device of a server through the communication module;
a storage module electrically connected to the processing module for storing the first image information, the second image information, the plurality of temperature values of the plurality of temperature measuring positions and the detected temperature value of the test subject; and
a power supply module electrically connected to the processing module for providing a driving electrical energy to the temperature measuring device.

11. A temperature measuring method, comprising:
capturing a first image information and a second image information of a test subject;
calculating a first reference area, a first temperature measuring area and a second temperature measuring area according to the first image information;
performing a mapping process on the first image information and the second image information, and calculating a second reference area, a third temperature measuring area and a fourth temperature measuring area of the second image information according to the first reference area, the first temperature measuring area and the second temperature measuring area of the first image information, respectively; and
selecting a plurality of temperature measuring positions in each of the third temperature measuring area and the fourth temperature measuring area and performing a temperature measurement to obtain a first detected temperature value and a second detected temperature value of the test subject;
wherein a first image capturing module is used for capturing the first image information, a second image capturing module is used for capturing the second image information, the first image capturing module is a visible light optical image capturing module, the second image capturing module is a thermal image capturing module, the first image information is a color image information or a grayscale image information, and the second information is a thermal image information;

wherein the first reference area includes a first dark subarea, a light subarea and a second dark subarea, and the first dark subarea, the light subarea and the second dark subarea are arranged sequentially in a horizontal direction.

12. The temperature measuring method according to claim 11, wherein the temperature measuring area is an area extending from a horizontal line connecting a first center of the first dark subarea of the first reference area and a second center of the second dark subarea of the first reference area toward the top of the head of the test subject.

13. The temperature measuring method according to claim 12, wherein a temperature measuring width is calculated according to the first reference area, the temperature measuring width being a distance between the first center of the first dark subarea of the first reference area and the second center of the second dark subarea of the first reference area.

14. The temperature measuring method according to claim 13, wherein a first temperature measuring height of the temperature measuring area is N times the temperature measuring width, where N is a rational number, and a second temperature measuring height of the second temperature measuring area is R times the temperature measuring width, where R is a rational number.

15. The temperature measuring method according to claim 14, wherein the mapping process is performed on the first image information and the second image information to calibrate coordinates of the first image information and the second image information, and the second reference area, the third temperature measuring area and the fourth temperature measuring area of the second image information are obtained according to the first reference area of the first image information.

16. The temperature measuring method according to claim 15, wherein a highest temperature value of the plurality of temperature values of the plurality of temperature measuring positions of the third temperature measuring area is the first detected temperature value of the test subject, and a highest temperature value of the plurality of temperature values of the plurality of temperature measuring positions of the fourth temperature measuring area is the second detected temperature value of the test subject.

* * * * *